US006317123B1

(12) United States Patent
Moline

(10) Patent No.: US 6,317,123 B1
(45) **Date of Patent: *Nov. 13, 2001**

(54) PROGRESSIVELY GENERATING AN OUTPUT STREAM WITH REALTIME PROPERTIES FROM A REPRESENTATION OF THE OUTPUT STREAM WHICH IS NOT MONOTONIC WITH REGARD TO TIME

(75) Inventor: William A. Moline, N. Reading, MA (US)

(73) Assignee: Laboratory Technologies Corp., Andover, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/716,949

(22) Filed: Sep. 20, 1996

(51) Int. Cl.[7] .............................. G06F 15/00; G10H 7/00

(52) U.S. Cl. .............................................. 345/302; 84/600

(58) Field of Search .................................... 345/302, 418, 345/422; 707/500–525, 526; 84/609, 602–604, 622; 380/25, 3, 5, 15

(56) References Cited

U.S. PATENT DOCUMENTS

| | | | | |
|---|---|---|---|---|
| 5,058,159 | | 10/1991 | Quan | 380/19 |
| 5,388,264 | * | 2/1995 | Tobias, II et al. | 395/650 |
| 5,487,167 | * | 1/1996 | Dinallo et al. | 345/302 |
| 5,491,751 | | 2/1996 | Paulson et al. | 380/25 |
| 5,524,051 | | 6/1996 | Ryan | 380/9 |
| 5,617,476 | | 4/1997 | Ibaraki | 380/49 |
| 5,630,132 | * | 5/1997 | Allran et al. | 395/670 |
| 5,679,913 | * | 10/1997 | Bruti et al. | 84/609 |
| 5,734,119 | * | 3/1998 | France et al. | 84/622 |
| 5,773,741 | * | 6/1998 | Eller et al. | 84/609 |
| 5,792,971 | * | 8/1998 | Timis et al. | 84/609 |

OTHER PUBLICATIONS

Pennybrook, Prof. Bruce, Faculty of Music, McGill University, *Class Notes*, Distributed Seminar—Winter 1996.
LeJeune, Urban A., *The New Netscape & HTML Explorer*, p. 337, The Coriolis Group, Inc., 1996.

Lipscomb, Eric, (BITNET:LIPS@UNTVAX), Introduction into MIDI, *North Texas Computing Center Newsletter*, “Benchmarks”, Oct. 1989, . . . //www.harmony–central.com/MIDI/Doc/intro.hmtl.

Avatar Ontology: The Santa Fe Project, Oct. 1, 1996, pp. 1–3, URL: www.resrocket.com/sfproject.

What is Res Rocket Surfer?, *Internet Today Magazine*, Jan. 1996, www.resrocket.com/wwwhelp/whatis/html.

Microsoft WIN32 Programmer’s Reference, Vol. 2, *System Services, Multimedia, Extensions, and Application Notes*, pp. 521, 524, 525, 529, 530, 531.

Netscape Plug–in, API from World–Wide–Web 1996.

Dick Oliver, Netscape2 unlelashed, Sams Net, pp. 231–233, Feb. 1996.*

* cited by examiner

*Primary Examiner*—Hosain T. Alam
*Assistant Examiner*—Alford W. Kindred
(74) *Attorney, Agent, or Firm*—Gordon E. Nelson

(57) ABSTRACT

A technique for reducing delay in generating an output stream with real-time characteristics from a serially-received representation of the output stream that is not monotonic with regard to time. One application of the technique is generating a MIDI stream from a multi-track MIDI file. The MIDI stream is generated from the first track while the remainder of the MIDI file is being received. As a point in each further track to be received is reached that corresponds to the point in the first track at which the MIDI stream is currently being generated, the MIDI stream is generated from that track as well. The listener thus at first hears only the first track to be received; as the others come in, he hears them as well. To ensure that the synthesizer which is responding to the output stream for the most recent track to be added does so correctly, the technique outputs control event messages but not note on and note off event messages from the part of the most recent track which precedes the point in the most recent track that corresponds to the point reached in the first track.

14 Claims, 4 Drawing Sheets

PROGRESSIVELY GENERATING AN OUTPUT STREAM WITH REALTIME PROPERTIES FROM A REPRESENTATION OF THE OUTPUT STREAM WHICH IS NOT MONOTONIC WITH REGARD TO TIME

BACKGROUND OF THE INVENTION

1. Field of the Invention

The invention generally concerns generating an output stream with real-time properties from a representation of the output stream that specifies the real-time properties of the output stream. More particularly, the invention concerns techniques for reducing the delay in beginning to generate the output stream from the representation when the representation is not monotonic with regard to time. The techniques are particularly useful in generating a stream of MIDI events from a MIDI file before the entire MIDI file has been received in the device that is generating the stream of events.

2. Description of the Prior Art

The Musical Instrument Digital Interface (MIDI) is a standard protocol for controlling electronic musical instruments such as synthesizers or the sound cards of personal computers. One common use of the protocol is permitting a musician to play more than one electronic instrument at once. The instrument that the musician is actually playing not only generates sounds, but also generates a sequence of event messages. An event message may for example be a note on message, that indicates that a note of a given pitch has started to sound or a note off message that indicates that the note has ceased sounding. Many other kinds of event messages are defined as well. Another instrument receives the event messages from the first instrument and responds by performing the actions indicated in the messages. Thus, if the message is a note on message, the other instrument will begin sounding the note, and will thus "play along with" the first instrument. For purposes of the present discussion, the event messages can be divided into two classes: the note on and note off messages and the remaining messages, which will be termed herein control messages.

The sequence of MIDI protocols to which a musical instrument directly responds is termed herein a MIDI stream. Devices which respond to a MIDI stream are termed herein MIDI devices. In a MIDI stream, time relationships between events are simply determined by when the events appear in the event stream. For example, if a note is to be held for a period of one second, the note on message for the note will appear in the MIDI stream one second before the note off message for the note appears in the stream. Since the MIDI device will start sounding the note in response to the note on message and stop sounding the note in response to the note off message, the note will be sounded for one second.

A MIDI stream may be produced not only by an electronic musical instrument, but also from a MIDI file. The MIDI file is stored in memory and is then read by a device called a MIDI controller to generate a MIDI stream. This process of reading a MIDI file and generating a MIDI stream from it is termed herein playing the MIDI file. A MIDI file is made up of a sequence of MIDI event messages separated by elapsed time descriptors. An elapsed time descriptor specifies the time that is to elapse between the time the MIDI controller places the MIDI event message that precedes the elapsed time descriptor in the MIDI stream and the time that the controller places the event message that follows the elapsed time descriptor in the MIDI stream. There are at present two standard formats for MIDI files. In one format, known as Format 0, the file is simply a single sequence of event messages and elapsed time descriptors. In the following, such a sequence of event messages and elapsed time descriptors will be termed a track. In the other format, known as Format 1, the file has a number of tracks. Each track corresponds roughly to a part in a piece of ensemble music. In the case of Format 0, the MIDI controller generates the MIDI stream from the file by outputting a given event message, waiting the time specified in the elapsed time descriptor, and outputting the next event message. In the case of Format 1, the MIDI controller generates the MIDI stream by reading the tracks "simultaneously", that is, by outputting the event messages in each track that correspond to a given point in time in the music to the MIDI stream at that point in time. Most MIDI files are format 1 files, since the use of tracks makes it easy to modify a part or add a part. The standards for both MIDI streams and MIDI files are defined in the MIDI Specification, copyright 1983 and available from the MIDI Manufacturers' Association.

FIG. 1 shows a prior-art arrangement 101 for generating a MIDI stream from a MIDI format 1 file 103. Midi file 103 has a header 104 which contains information such as the number of tracks. The MIDI file also contains at least one track 105. A given track i in such a file is indicated hereinafter by 105(*i*). Each track 105(*i*) contains a sequence of events 106. Each event 106(*j*) has two parts: an event message 117 and an elapsed time descriptor 119. The elapsed time descriptor indicates the time that is to elapse between the preceding event 106(*j*–1) and event 106(*j*). As can be seen from the foregoing, a given event 106's position in file 103 may be indicated by the index of its track and its own index in the track. Event 106(*i,j*) is thus event j in track i.

The MIDI stream 111 is generated from MIDI file 103 by MIDI controller 107. Prior-art MIDI controller 107 does this by first writing all of the tracks 105 from file 103 into controller memory 109, as shown by arrow 108, and then reading all of the tracks simultaneously in the fashion just described, as shown by arrow 110. To accomplish the simultaneous reading, MIDI controller 107 maintains a song position time value 121 which the controller can use together with the elapsed time descriptors to determine which event messages are to be output from the tracks at a given time. As would be expected from this procedure, and as shown in FIG. 1, MIDI stream 111 generally consists of interleaved event messages 117 from the tracks 105. MIDI stream 111 may then be responded to by any MIDI device 113, which then drives loudspeaker 115 to produce the sounds specified by MIDI stream 111.

While the MIDI protocol was originally developed for electronic instruments, it is being increasingly used in computer systems. In such systems, the MIDI files are stored at a location accessible to the computer system, the MIDI controller is a program which executes in the computer system, and the MIDI device to which the MIDI controller outputs the MIDI stream is a sound board in the computer system. Even more recently, MIDI files have been included as part of World Wide Web pages that may be accessed via the Internet. The Web browsers that are used to view such pages include programs that work as MIDI controllers to play the MIDI file included in the Web page as the Web page is being viewed. The included MIDI file can thus be used to provide background music for the Web page. When a user has a Web browser that can play a MIDI file, the user can also select a link to a MIDI file from a Web page and hear the music that the MIDI file represents. An example of a Web browser that can play a MIDI file is the well-known Netscape browser with the Crescendo plug-in produced by Laboratories Technologies Corporation, 400 Research Drive, Wilmington, Mass. 01887. Netscape and Crescendo are trademarks of Netscape Communications Corporation and Laboratories Technologies Corporation, respectively.

A problem with prior-art MIDI controllers 107 is that controller 107 must load all of the tracks from MIDI file 103 being played into controller memory 109 before MIDI controller 107 can start playing MIDI file 103. Consequently, there will always be some delay between the time that controller 107 is commanded to start playing MIDI file 103 and the time that MIDI device 113 actually begins to output music. The length of the delay will of course depend on the size of file 103 and the bandwidth of the connection upon which MIDI controller 107 is receiving file 103. There are many cases in which the delay will be non-trivial, first, because the files may be very large (300 Kilobyte files with 35 tracks are not unknown) and second, because the files are often transferred via low-bandwidth connections. The latter situation is indeed generally the case when a MIDI file is being transferred via the Internet. While the MIDI file is being received and the tracks loaded into memory, there is nothing for the user to do but wait. This is of course particularly annoying when the MIDI file was intended to be background music for a Web page that must be displayed without music until the MIDI file is loaded.

The delay problem just described with regard to MIDI files exists wherever an output stream with real-time properties must be output from a representation in which the representation of the output stream is not monotonic with regard to time. One situation where this can occur with even a single track is if the material in the track is not in the order in which it is to be played. Another is where the representation of the output stream includes a plurality of segments that are read together to generate the output stream.

It is thus an object of the invention to provide methods and apparatus for overcoming the problems of delay that arise when an output stream with real-time properties is generated from a representation of the output stream which is not monotonic with regard to time.

SUMMARY OF THE INVENTION

The techniques of the invention solve the delay problem by beginning to generate the output stream before the entire representation has been received and continuing to generate the output stream as the representation is received. As each new portion of the output stream is received, it is used together with the previously-received portions to produce the output stream. Thus, in the case of Format 1 MIDI files, the person playing the MIDI file first hears only that part which is on the first track to be received. As each new track is received, the person playing the MIDI file hears the music with the part on the new track added. An important aspect of the techniques of the invention is that each new track begins contributing to the output at the point in the music that has been reached in the first track to be received. In the case of Format 1 MIDI files, the techniques of the invention output control event messages from the portion of the new track that precedes the point in the new track that corresponds to the point that has been reached in the first track and outputs both control event messages and on and/or off event messages following that point in the new track. Outputting control event messages in this manner insures that the synthesizer correctly responds to the note on and/or note off event messages that are output after that point in the new track. In another aspect, the invention may be implemented in a World Wide Web browser, and may be particularly advantageously implemented as a plugin in such a browser.

The foregoing objects and advantages of the invention will be apparent to those skilled in the arts to which the invention pertains upon perusal of the following Detailed Description and drawing, wherein:

Figure 1:
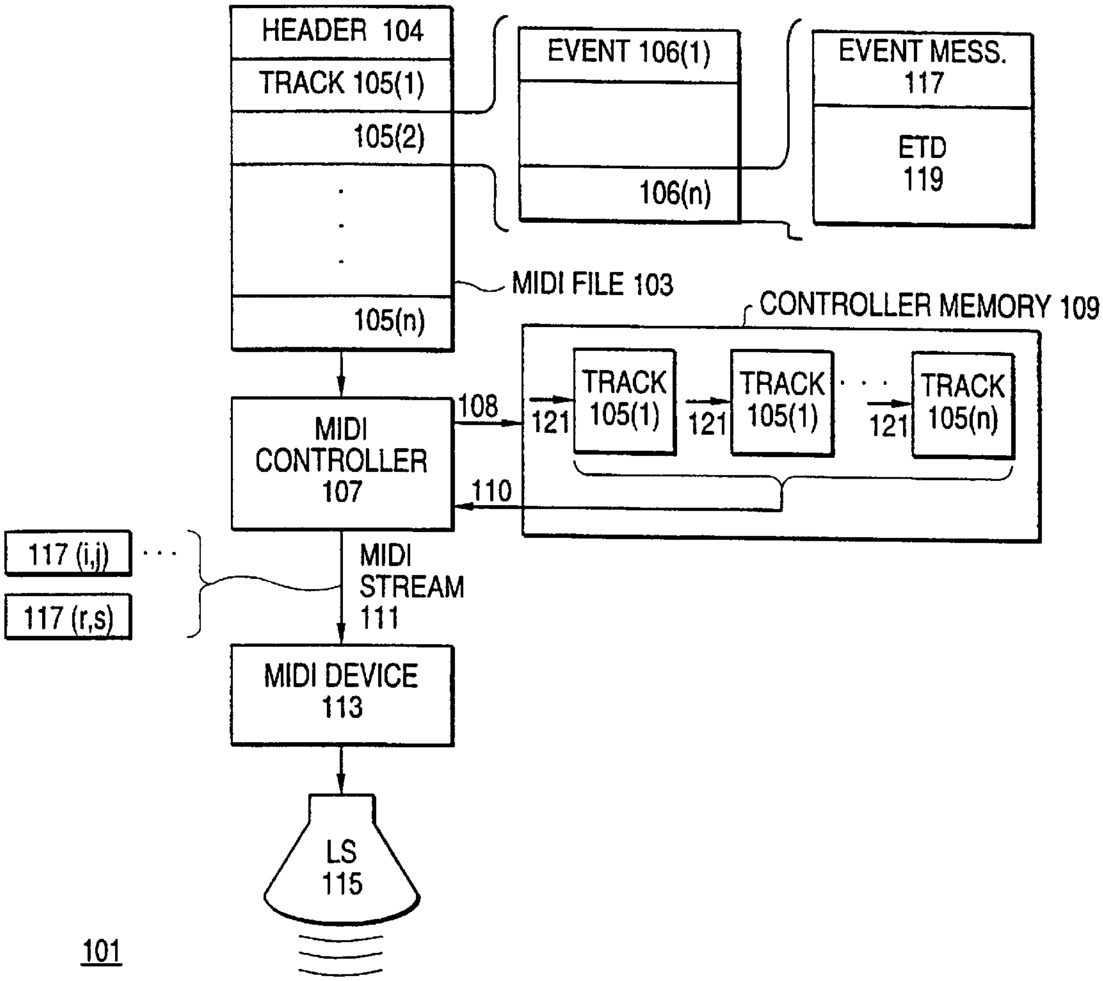
FIG. 1 (PRIOR ART)
FIG. 1 is a block diagram of a prior-art system for playing a MIDI file.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

DETAILED DESCRIPTION

The following Detailed Description will first describe how MIDI controller 107 may be modified to begin playing a track before the entire track has been received in MIDI controller 107, will then describe how MIDI controller 107 may be modified to play a Format 1 MIDI file when all of the MIDI file's tracks have not yet been loaded into controller 107's memory, and will finally show how the invention may be implemented in the environment provided by the Netscape Web browser.

Figure 2:
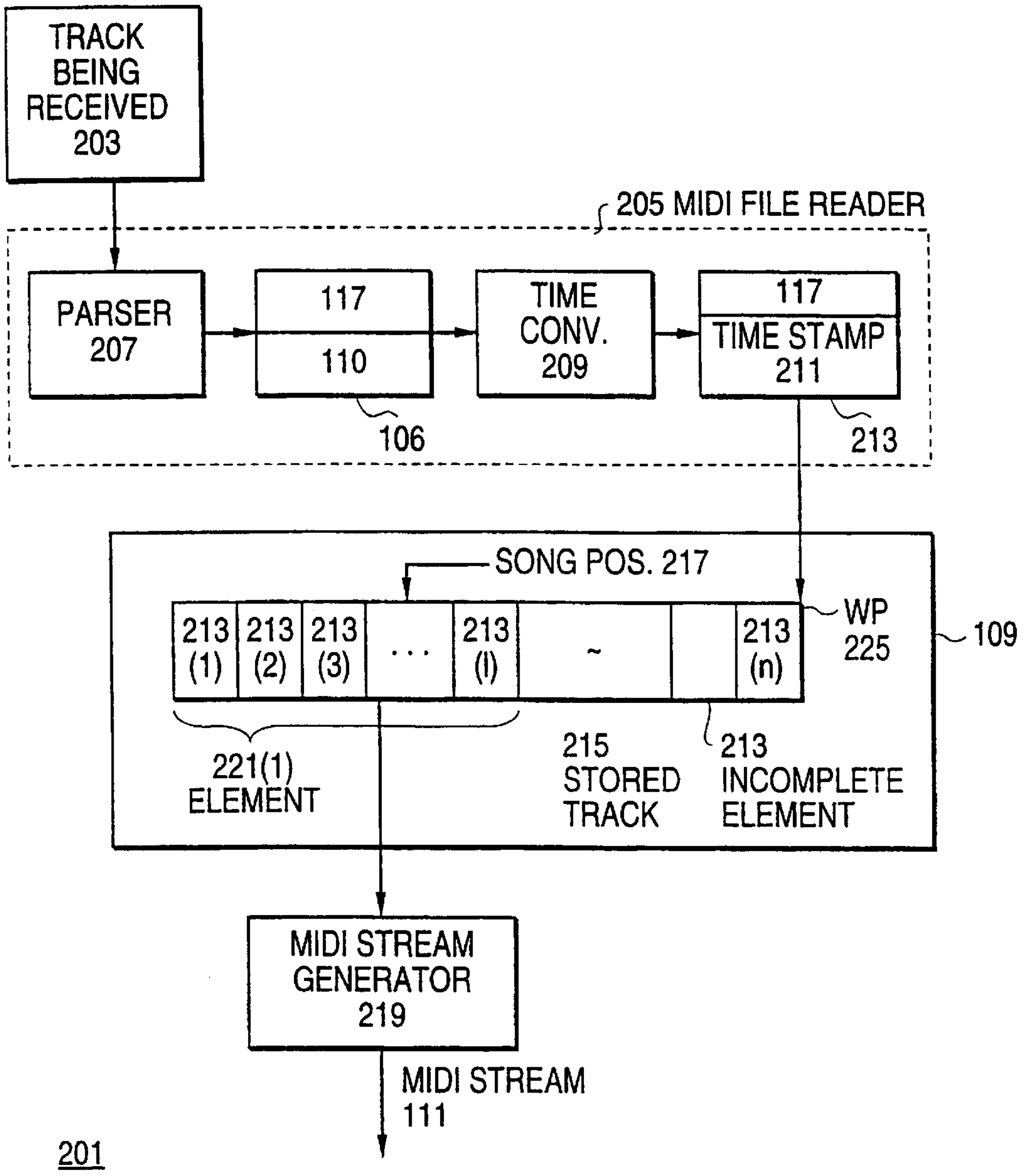
FIG. 2 is a block diagram of modifications to a MIDI controller to permit playing an incomplete track.

Playing a Track While It is Being Received: FIG. 2

FIG. 2 shows how a MIDI controller like that shown at 107 may be modified to begin playing a track of a MIDI file 103 before the entire track has been received in controller 107. Modified controller 201 has two main components: a MIDI file reader 205, which reads the track 203 being received and places information from the track in memory 109, and MIDI stream generator 219, which reads what file reader 205 has placed in memory 109. In contradistinction to prior-art MIDI stream generators, MIDI stream generator 219 does not wait to begin reading until file reader 205 has finished reading all of track 203 into memory 109, but instead operates concurrently with file reader 205. In the preferred embodiment, both file reader 205 and MIDI stream generator 219 are event driven: File reader 205 responds to an event that indicates that the next portion of track 203 has been received in controller 107; whenever the event occurs, file reader 205 runs and places the MIDI events 106 from that portion in memory 109; MIDI stream generator 219 responds to a timer runout event. That event occurs whenever a timer set by MIDI stream generator 219 runs out. In a preferred embodiment, MIDI stream generator 219 sets the timer to run out after an interval of 2 milliseconds. In general, the shorter the interval, the closer the output stream will approximate the original MIDI stream captured in the MIDI file.

Conceptually, MIDI stream generator 219 keeps track of the last event 106 that it output, the amount of time that has actually elapsed since it began playing the track, and the total amount of time specified by the elapsed time indicators in the events 106 played thus far. Each time the timer expires, MIDI stream generator 219 looks at events 106, beginning with the one following the last event 106 that it output. If the sum of the total elapsed time and the elapsed time indicator for an event is less than or equal to the time that has actually elapsed, MIDI stream generator 219 outputs the event. The intervals at which the timer runs out are short enough so that the intervals separating the event messages in MIDI stream 111 are substantially those specified in the elapsed time descriptors 119. Since file reader 205 generally receives track 203 much more rapidly than MIDI stream generator 219 reads it, MIDI stream generator 219 can play track 203 as it is loaded.

Continuing in more detail, MIDI file reader 205 includes two subcomponents that are important for the present discussion: parser 207 and time converter 209. Parser 207 reads events 106 in order from track 203. Each event 106 of course includes event message 117 and elapsed time descriptor 119. As an event is read, it is passed to time converter 209, which converts elapsed time descriptor 119 to time stamp 211. As previously described, elapsed time descriptor 119 specifies the time elapsed since the last event message 117; time stamp 211 contains the sum of the elapsed times in all of the time descriptors 119 from the beginning of track 203 to the current event 106. The result of this operation is an event 213, which is then added to stored track 215 in memory 109. The point at which the next event is to be added is specified by write pointer (WP) 225. Elapsed time descriptor 119 is converted to time stamp 211 in the preferred embodiment in order to simplify the computations performed by MIDI stream generator 219 in determining whether an event is to be output to MIDI stream 111.

In a preferred embodiment, stored track 215 is subdivided into elements 221. When MIDI file reader 205 begins reading events 106 from file 203, it allocates an element 221; it places events 106 in the element until it is full and then allocates another element. All elements but the last to be allocated are full, and consequently, MIDI stream generator 219 can detect when it is approaching the end of stored track 215 currently being written by the presence of an incomplete element 223. In the preferred embodiment, an incomplete element 223 is one for which write pointer 225 is not at the end of the element.

MIDI stream generator 219 generates MIDI stream 111 from stored track 215 as follows:

Each time the timer expires, do the following:

1. Determine how much time has actually elapsed since MIDI stream generator 219 has begun playing the track; this is the current song position, indicated in FIG. 2 as SongPos 217.
2. Beginning with the event 213 following the last event to be played, output event messages 117 until either an event 213 is reached whose time stamp is greater than SongPos 217 or one is reached that is in an incomplete element 223.
3. At that point, set the timer and wait for it to expire again.

Figure 3:
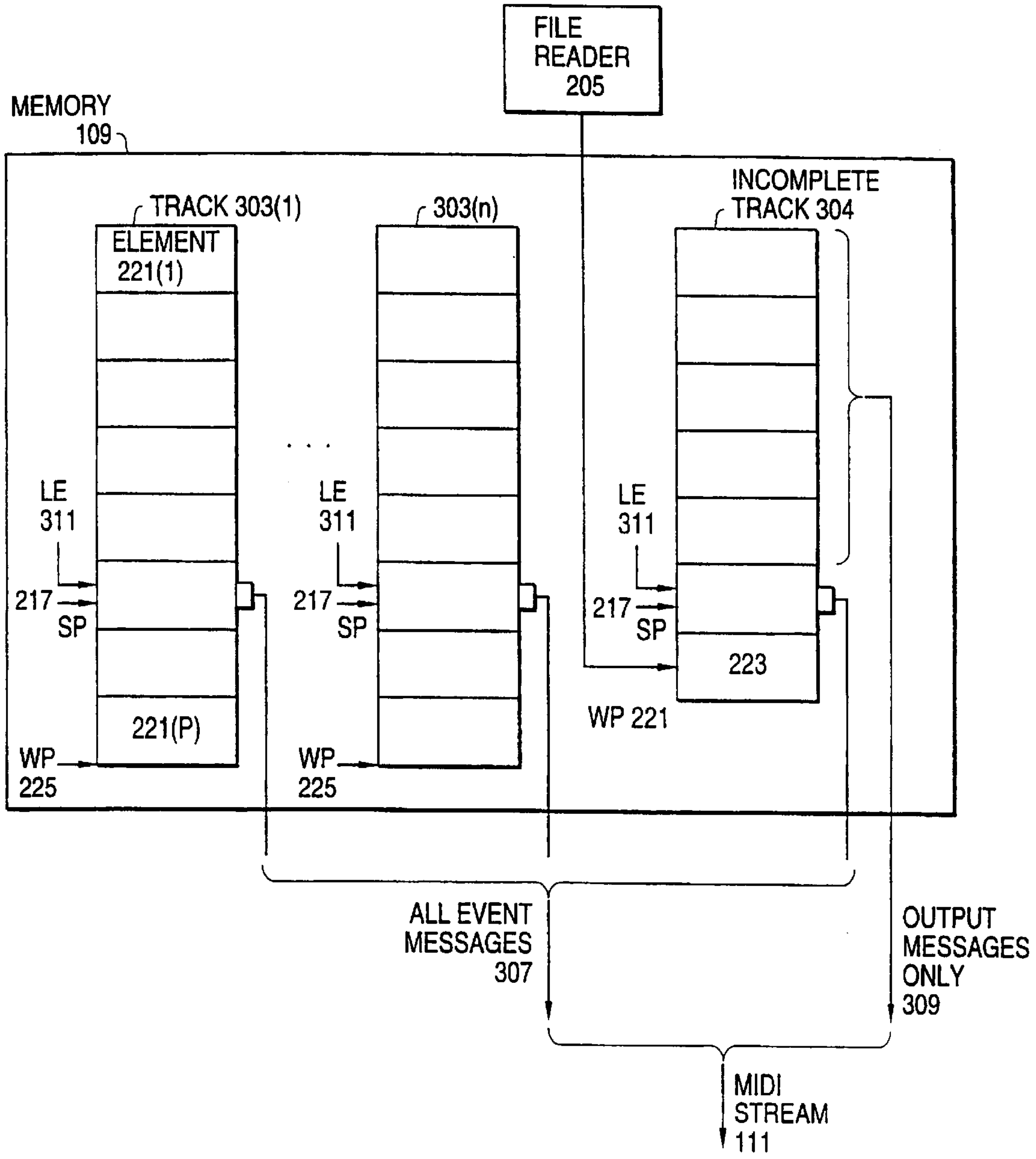
FIG. 3 is a block diagram of a further modification to a MIDI controller to permit playing a multi-tracked MIDI file with an incomplete track.

Playing Multi-Tracked MIDI Files as they are Received: FIG. 3

The technique just described is sufficient for playing MIDI files with only one track, such as Format 0 MIDI files or Format 1 Midi files with only one track. With multi-track files, it is also necessary to solve the problems resulting from the fact that MIDI stream generator 219 plays each track at the position determined by SongPos 217 and must therefore be able to begin playing tracks other than the first track to be received "in the middle". Starting in the middle is complicated by the fact that how a MIDI device responds to a note on or note off event message is determined not only by the message, but also by control event messages which preceded the note on or note off message in MIDI stream 111.

FIG. 3 shows how file reader 205 writes the tracks it receives into memory 109 and how MIDI stream generator 219 reads the tracks. File reader 205 receives the tracks sequentially, and as it receives each track, it writes the track to memory 109 as described with regard to FIG. 2 above. As a result, the tracks appear as shown in FIG. 3. File reader 205 has already read tracks 105(1) through 105(n−1) into memory as stored tracks 301(1) through 303(n−1). That these tracks are complete is indicated by the fact that the track's write pointer 225 is at the end of the last element. File reader 205 is presently reading track 105(n) and has stored the portion it has read in incomplete stored track 304. Each track 303 is made up of a sequence of elements 221, with the last element in track 304 being an incomplete element 223 to which file reader 205 is still writing events 213.

MIDI stream generator 219 begins generating MIDI stream 111 from track 303(1) as soon as file reader 205 has written the first complete element 221 to the file. In other embodiments, MIDI stream generator 219 may begin reading even before the first complete element has been written. Of course, at this point, MIDI stream 111 contains only event messages from track 303(1), and consequently, the MIDI device that is responding to stream 111 plays only the part contained in track 303(1). For example, if that track contains the percussion part, that is the first part that the responding device plays. As soon as file reader 205 has written enough of track 303(2) that SongPos 217 specifies a location in a completely-written element 221, MIDI stream generator 219 begins generating MIDI stream 111 from track 303(2) as well, and so on, until file reader 205 has written the last track past the location currently represented by SongPos 217. At that point, MIDI stream 111 is being generated from all of the tracks 303 and 304.

As heard by the listener, the music begins with the part contained in the first track to be received; as each track is received, the part contained in the track is added, until the listener finally hears all of the parts together. This incremental addition of parts has an effect which is similar to the incremental increase in definition that is often employed when a graphics element is displayed on a Web page. The user begins seeing, the graphics element or hearing the music with minimum delay and can often even decide on the basis of the low-definition display of the graphics element or the rendering of the music with fewer than all of the parts whether he or she has any further interest in the graphics element or the music.

MIDI stream generator 219 generates MIDI stream 111 from complete tracks 303 (1 . . . n) and incomplete track 304 as follows:

Each time the timer expires, do the following:

1. For each track, determine how much time has actually elapsed since MIDI stream generator 219 has begun playing the track; this is the current song position, indicated in FIG. 2 as SongPos 217.
2. In each complete track 303, beginning with the event 213 following the last event to be played, output event messages 117 until an event 213 is reached whose time stamp is greater than or equal to SongPos 217.
3. In incomplete track 304,
   a. do nothing if the current position indicated by SongPos 217 is beyond the last complete element 221 in incomplete track 304.
   b. Otherwise,
      i. If this is the first time event messages 117 have been output from incomplete track 304, begin at the top of track 304 and output only the control event messages until SongPos 217 is reached.

ii. After the first time, treat incomplete track 304 in the same fashion as complete tracks 303.

4. Set the timer and wait for it to expire again.

Outputting the control event messages but not the none on or note off messages from the beginning of incomplete track 304 to SongPos 215 the first time event messages are output from incomplete track 304 ensures that the MIDI device which receives plays MIDI stream 111 will have received all of the control messages it needs when it plays the note on or note off events output between last event 311 and SongPos 217. Any technique which achieves the same purpose may be employed instead of the one just described. For example, in other embodiments, MIDI stream generator 219 may search back through the track until it has found all of the control event messages relevant to the current position of SongPos 217 and then output only those control event messages before beginning to output note on or note off event messages.

The foregoing appears in FIG. 3 as arrow 307, showing how in all tracks from which event messages have already been output, all event messages between last event 311 in the track and SongPos 217 are output to MIDI stream 111, and arrow 309, showing how the first time event messages are output from incomplete track 304, only the control event messages are output from the top of incomplete track 304 through SongPos 217.

Figure 4:
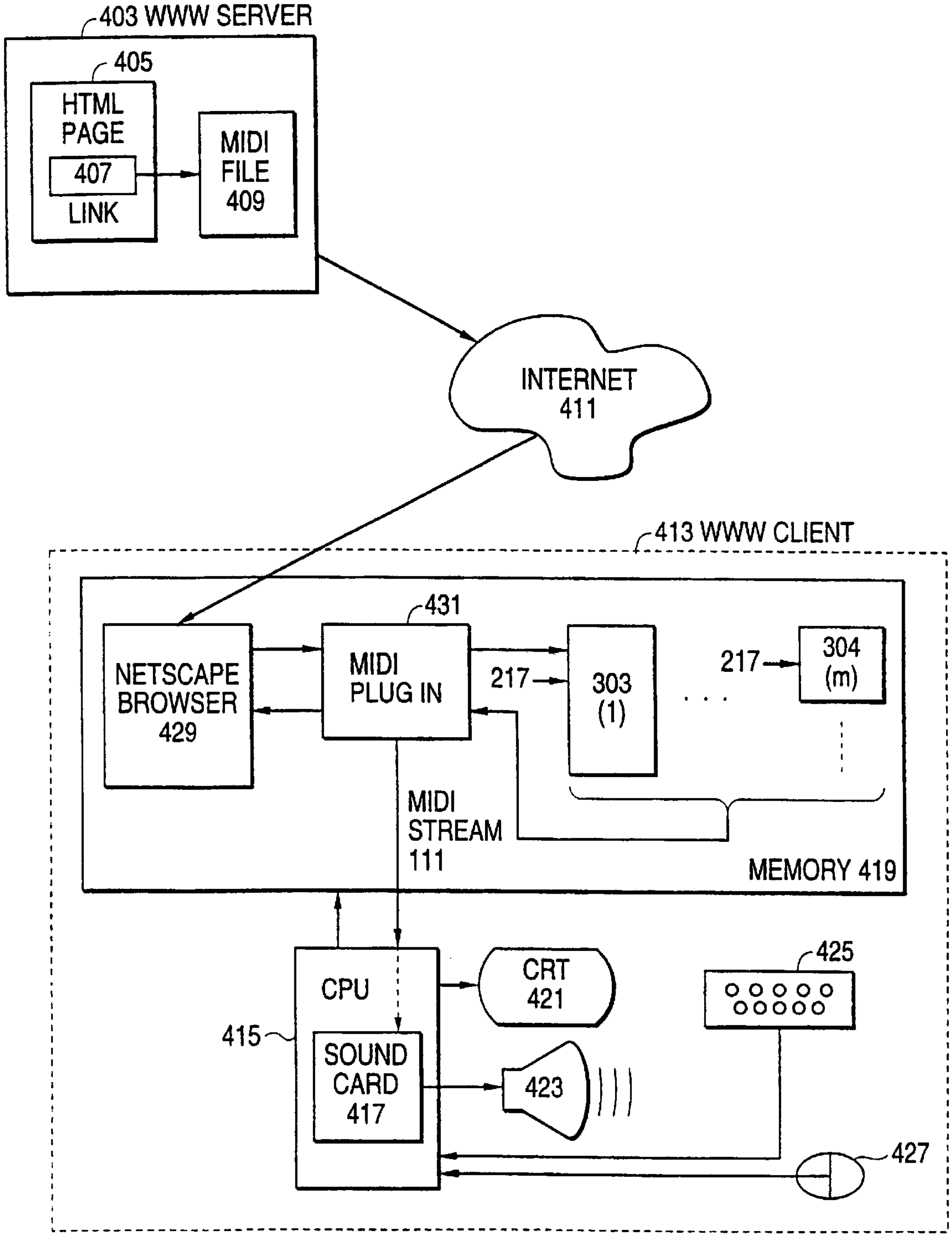
FIG. 4 is a block diagram of an embodiment of the invention for use with a World Wide Web browser.

Incorporating the Invention into a Web Page Browser: FIG. 4

As indicated above, one application in which the invention's ability to begin playing before a complete MIDI file has been received by the MIDI controller is particularly valuable is where the MIDI file is being transferred via the Internet, either as an inclusion in a Web page which has been downloaded by a user or as a file that is referred to by a link in a Web page. In such applications, the most natural place to implement the invention is in a World Wide Web browser.

FIG. 4 shows a presently-preferred implementation of the invention in a Netscape browser. System 401 includes a World Wide Web server 403 which serves pages 405 written in the HTML language via Internet 411 to a World Wide Window client 413. An HTML page 405 may include a link 407 to a MIDI file 409. Client 413 may be implemented in any kind of computer system, but client 413 is implemented in FIG. 4 in a standard PC. The PC has a memory 419, a processor 415 which includes a sound card 417 which is a MIDI device, and peripheral devices including a CRT display 421, a loudspeaker 423 which is connected to sound card 417, keyboard 425, and mouse 427. The program which causes the PC to function as a World Wide Web client 413 is Netscape browser 429, which responds to an input of a Universal Resource Locator (URL) specifying an HTML page 405 in a particular server 403 by first executing a protocol which retrieves the page 405 from server 403 and then interprets the page to produce a display in CRT 421 of the type specified by HTML page 405.

A given HTML page may have non-HTML inclusions such as pages written in different mark up languages, files containing vector graphics, compressed video, sound files, or MIDI files. If a browser includes the software to respond to such a file, the browser will display or play the file; otherwise, it will just display the surrounding HTML. Given the pace at which Web technology is changing and the varying needs of users of browsers, providing the software needed to read inclusions has become a problem for manufacturers of browsers. Netscape Communications Corporation has addressed this problem by making it easy for third parties to write software which can be used by Netscape browsers to read inclusions. Such software is termed by the art a "plugin".

A MIDI plugin incorporating the invention is shown at 431 in FIG. 4. A user of a Netscape browser 429 can use his browser to download a desired plugin from the Internet, and after the browser has downloaded the plugin, the user can place it in a directory in which browser 429 looks for plugins. When browser 429 receives an inclusion of the type read by the plugin, the browser activates the plugin. The plugin uses browser 429's facilities to fetch the inclusion and then reads or plays the inclusion. As shown in FIG. 4, a MIDI plugin 431 which incorporates the invention performs substantially the same tasks as a MIDI controller which incorporates the invention. Plugin 431 has a file reader 205 and a MIDI stream generator 219. File reader 205 reads MIDI file 409 serially as it is received in browser 429 and outputs events 213 to memory 419. File reader 205 includes a parser 207 which reads events 106 and a time converter 209 which converts elapsed time descriptors 119 to time stamps 211 and thereby produces events 213. As this process goes on, one or more tracks 303 are written to memory 419, with file reader continuing to write to the end of the track that is currently being received in browser 429. Meanwhile, MIDI stream generator 219 operates as just described to generate MIDI stream 111 from tracks 303 and 304. The event messages go to sound card 417, which drives PC loudspeaker 423. Netscape Communications Corporation has defined an Application Programmer's Interface (API) for plugins for the Netscape browser. A detailed description of plugins for the Netscape browser and of the Application Programmer's Interface could be found in September, 1996 at the URL http://home.netscape.com/eng/mozilla/3.0/handbook/plugins/pguide.htm Conclusion An underlying principle of the invention disclosed herein is that the delay between the time a representation of an output stream with real-time characteristics that is non-monotonic with regard to time is received and the time the output stream begins to be generated from the representation can be usefully reduced by beginning to generate the output stream before the entire file has been received. The Detailed Description has disclosed to those skilled in the relevant arts how the principle may be applied in techniques for playing MIDI files, and has further disclosed the best mode presently known to the inventor of implementing the invention.

As already pointed out, the principle of the invention may be applied in any situation where an output stream that has real-time characteristics must be generated from a representation of the output stream that is non-monotonic with regard to time. For example, the technique may be applied to wave-form representations of music in which separate tracks are read simultaneously or to representations of animations where outlines and colors are represented in separate tracks. The detailed implementation of the invention will of course always depend on the characteristics of the file being read and of the output stream. Moreover, the techniques for playing MIDI files may be implemented in environments other than browsers, and may be implemented in browsers using techniques other than the plugin disclosed herein. Finally, the particular algorithms disclosed herein for reading the file and generating the output stream may be replaced by other algorithms which also implement the principles of the invention.

For all of the foregoing reasons, the Detailed Description is to be regarded as being in all respects exemplary and not restrictive, and the breadth of the invention disclosed herein is to be determined not from the Detailed Description, but rather from the claims as interpreted with the fill breadth permitted by the patent laws.

What is claimed is:

1. A method of generating an output stream that has real-time characteristics from a corresponding representation of the output stream, the representation being serially received in the device and stored therein and having the property that a first segment is followed by an additional segment, the first and additional segments being intended to be read together by the device to generate the output stream, the method comprising the steps of:

beginning to generate the output stream from the first segment as soon as a portion thereof has been stored in the device; and as soon as a portion of the additional segment has been stored which is sufficient to permit producing the output stream therefrom as well, beginning to generate the output stream from both the first segment and the additional segment.

2. The method set forth in claim 1 wherein:

the segments are intended to be read in parallel in a sequential manner; and

The step of beginning to generate the output from both the first segment and the additional segment begins when the portion of the additional segment which has been stored includes a first point which corresponds to a second point at which the output stream is currently being generated firm the first segment.

3. The method set forth in claim 2 wherein:

the output stream represents a performance of music; and a given one of the segments represent a part of the performance.

4. The method set forth in claim 3 wherein the representation is multi-tracked MIDI file, the segments are MIDI tracks containing control event messages and note on and/or note off event messages, and the out stream is a MIDI stream; and the step of the beginning to generate the out stream from both the first segment and the additional segment comprises:

the step of outputting those note on event messages and/or note off event messages which follow the first point in the additional segment.

5. The method set forth in claim 4 wherein the step of beginning to generate the output stream from both the first segment and the additional segment further comprises:

the step performed prior to outputting any note on messages or note off messages from the additional segment of outputting control event messages that precede the first point in the additional segment.

6. The method set forth in claim 1 wherein:

there is at least one further additional segment which is received serially after the additional segment; and the step of beginning to generate the output from both the first segment and the additional segment further generates output from a given one of the further additional segments when a portion of a given one of the further additional segments which has been stored is sufficient therefor.

7. Storage means characterized in that:

the storage means contains a program which, when executed, performs the steps of the method set forth in claim 1.

8. The storage means set forth in claim 7 further characterized in that:

the program is a program that is executed by a network browser.

9. The storage means set forth in claim 8 further characterized in that:

the program is a plugin for the network browser.

10. The storage means set forth in claim 9 further characterized in that:

the storage means is storage means in a network server from which the program a may be downloaded to the browser.

11. The method set forth in claim 1 wherein:

the representation is received from a network server; and the steps of the method are performed in a network client.

12. The method set forth in claim 8 wherein:

the network client includes a network browser, and the steps of the method are performed by the browser.

13. The method set forth in claim 12 wherein:

the network client includes a plugin which is activated by the browser upon receiving the representation and which performs at least the step of beginning to generate the output stream.

14. A method of generating a MIDI stream from a multi-tracked MIDI file, the method comprising the steps of:

serially receiving the MIDI file in a device and storing the MIDI file therein as the MIDI file is received; and before the entire MIDI file has been received in the device, beginning to generate the MIDI stream from a track of the MIDI file whose beginning has already been received in the device.

* * * * *